(12) United States Patent
Shim

(10) Patent No.: US 8,259,277 B2
(45) Date of Patent: Sep. 4, 2012

(54) LIQUID CRYSTAL DISPLAY DEVICE AND METHOD FOR FABRICATING THE SAME

(75) Inventor: Jae-Hoon Shim, Kyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 49 days.

(21) Appl. No.: 12/318,530

(22) Filed: Dec. 30, 2008

(65) Prior Publication Data

US 2009/0323007 A1 Dec. 31, 2009

(30) Foreign Application Priority Data

Jun. 27, 2008 (KR) .................. 10-2008-0061972

(51) Int. Cl.
*G02F 1/1339* (2006.01)
(52) U.S. Cl. ................... 349/155; 349/156; 349/157
(58) Field of Classification Search .................. None
See application file for complete search history.

(56) References Cited

U.S. PATENT DOCUMENTS

| | | | | |
|---|---|---|---|---|
| 2005/0185130 A1* | 8/2005 | Oh et al. | ........................ | 349/156 |
| 2005/0231669 A1* | 10/2005 | Kim | ................ | 349/138 |
| 2005/0275328 A1* | 12/2005 | Tseng et al. | ................... | 313/292 |
| 2006/0244894 A1* | 11/2006 | Yoon | ................ | 349/155 |
| 2006/0290863 A1* | 12/2006 | HoeSup | .................. | 349/141 |
| 2007/0002265 A1* | 1/2007 | Kwak et al. | .................... | 349/156 |
| 2007/0153215 A1* | 7/2007 | Lee | ................................. | 349/156 |
| 2009/0168007 A1* | 7/2009 | Chung et al. | .................... | 349/157 |
| 2010/0103364 A1* | 4/2010 | Choi et al. | ..................... | 349/157 |

* cited by examiner

*Primary Examiner* — Thanh-Nhan P. Nguyen
(74) *Attorney, Agent, or Firm* — Morgan, Lewis & Bockius LLP

(57) ABSTRACT

A liquid crystal display (LCD) device includes a first substrate having a plurality of pixels defined by crossing gate lines and data lines; a second substrate facing the first substrate; a thin film transistor formed at each crossing between the gate line and the data line on each pixel and having a gate electrode connected to the gate line and a source electrode connected to the data line; a pixel electrode formed at each pixel and connected to a drain electrode of the thin film transistor; a plurality of column spacers formed between the first and second substrates and configured to maintain a gap therebetween; and a protrusion formed on the first substrate and overlapped with one or more of the plurality of column spacers, wherein the protrusion includes a first layer made of the same material as an active layer of the thin film transistor and formed on the same layer as the active layer; a second layer made of the same material as the source and drain electrodes of the thin film transistor and formed on the same layer as the electrodes; and a third layer made of the same material as the pixel electrode and formed on the same layer as the pixel electrode.

5 Claims, 8 Drawing Sheets

| | THICKNESS (Å) | TABLE OF LIQUID CRYSTAL MARGINS | | | | | | | | |
|---|---|---|---|---|---|---|---|---|---|---|
| | | DOT | Split | 1 | 2 | 3 | 4 | 5 | 6 | 7 | 8 |
| | | 234 | -10 | | | | | | | | |
| | | 236 | -8 | | | | | | | | |
| | | 233 | -6 | | | | | | | | |
| RELATED ART | 2000 | 240 | -4 | | | | | | | | |
| | | 242 | -2 | | | | | | | | |
| | | 244 | 0 | | | | | | | | |
| | | 246 | +2 | | | | | | | | |
| | | 248 | +4 | | | | | | | | |
| | | 250 | +6 | | | | | | | | |
| | | 252 | +8 | | | | | | | | |
| | | DOT | Split | 1 | 2 | 3 | 4 | 5 | 6 | 7 | 8 |
| | | 234 | -10 | | | | | | | | |
| | | 236 | -8 | | | | | | | | |
| LCD DEVICE HAVING CPMPARATIVE PROTRUSION | 2500 | 233 | -6 | | | | | | | | |
| | | 240 | -4 | | | | | | | | |
| | | 242 | -2 | | | | | | | | |
| | | 244 | 0 | | | | | | | | |
| | | 246 | +2 | | | | | | | | |
| | | 248 | +4 | | | | | | | | |
| | | 250 | +6 | | | | | | | | |
| | | 252 | +8 | | | | | | | | |

LIQUID CRYSTAL DISPLAY DEVICE AND METHOD FOR FABRICATING THE SAME

This application claims the benefit of Korean Application No. 10-2008-0061972, filed on Jun. 27, 2008, which is hereby incorporated by reference in its entirety.

BACKGROUND OF THE INVENTION

1. Field of the Invention

The present invention relates to a liquid crystal display (LCD) device and a method for fabricating the same, and more particularly, to an LCD device having an enhanced displaying quality of screen in a structure of minimizing a damage of a column spacer due to vibration caused by an external force, and a method for fabricating the same.

2. Background of the Invention

Generally, a liquid crystal display (LCD) device is being widely used due to advantages such as a light weight, a thin thickness, and low power consumption. Accordingly, the LCD device is being widely used to display images on screens of a portable computer, a portable phone, and office automation equipment.

The LCD device displays desired images on a screen by controlling optical transmittance according to image signals applied to a plurality of controlling switching devices arranged in a matrix format.

The LCD device comprises an upper substrate as a color filter substrate, a lower substrate as a thin film transistor (TFT) array substrate facing the upper substrate, an LC panel including an LC layer sandwiched by the upper and lower substrates, and a driving portion for driving the LC panel by supplying scan signals and image information to the LC panel.

FIG. 1 shows a cross-sectional view of a LCD device according to the related art. As shown in FIG. 1, a general LCD device according to the related art includes a first substrate 1a defining a thin film transistor (TFT) substrate, a second substrate 1b defining a color filter substrate, and an LCD layer 40 interposed between the first substrate 1a and the second substrate 1b.

Although not shown in detail in the drawing, gate lines 2 and data lines (not shown) which cross each other horizontally and perpendicularly on the first substrate 1a to define a plurality of pixels, and a TFT 4 is disposed at each crossing between the gate line 2 and the data line of each pixel.

The TFT 4 includes a gate electrode 4a formed on the first substrate 1a, a gate insulating layer 4b on the gate electrode 4a, an active layer 4c on the gate insulating layer 4b, and source electrode 4d and drain electrode 4e both on the active layer 4c. The source electrode 4d and the drain electrode 4e are covered with a protection film 9.

A plurality of protrusions 8 having a double-layered structure are formed on each gate line 2 on the first substrate 1a. Each protrusion 8 is implemented, having a layer 8a formed on the same layer as the active layer 4c being located and made of the same material as the active layer 4c, and a layer 8b formed on the same layer as the source and drain electrodes 4d and 4e being located and made of the same material as those electrodes 4d and 4e.

Referring to FIG. 1, a column spacer 7 for maintaining a gap (space) between the first substrate 1a and the second substrate 1b is formed on the second substrate 1b. The column spacer 7 is partially overlapped with the protrusion 8 formed on the first substrate 1a.

If it is assumed that part of the column spacer 7 overlapped with the protrusion 8 is referred to as a first column spacer 7a and part of the column spacer 7 not overlapped with the protrusion 8 is referred to as a second column spacer 7b, the first column spacer 7a serves to maintain a constant gap between the first substrate 1a and the second substrate 1b together with the protrusion 8, and the second column spacer 7b is configured to come in contact with a top layer of the first substrate 1a when the second substrate 1b is pressed by a user's touch or the like, so as to prevent the deformation of the first and second substrates 1a and 1b and induce a fast restoration thereof.

Although not shown in detail, the first and second substrates 1a and 1b are received and fixed in a casing including a lower cover (not shown), an upper cover (not shown) and a main support (not shown) and the like. Most of such casing is disposed to press edges of the first and second substrates 1a and 1b.

The general LCD device according to the related art having such configuration is configured such that the first column spacer 7a and the protrusion 8 are not bonded to each other but rather contacted by each other directly or indirectly. Accordingly, the first column spacer 7a and the protrusion 8 may move in respectively different directions due to vibration caused by an external force, resulting in friction occurred therebetween. In this case, the first column spacer 7a may partially be deformed or damaged, which may cause the change in the gap between the first substrate 1a and the second substrate 1b. The deformation or damage of the first column spacer 7a due to such friction results from the first column spacer 7a having a greater size than the protrusion 8 and being made of polymer with elasticity.

In particular, the deformation or damage of the first column spacer 7a frequently occurs at an area adjacent to the casing. This is because in case where a vibration caused by an external force is applied to the first and second substrates 1a and 1b, while the protrusion 8 defined at the area adjacent to the casing moves in a certain direction, the first column spacer 7a generates resistance in a direction opposite to the movement direction of the protrusion due to an interference of the case.

FIG. 2 is a photograph showing an image defective area in the related art LCD device of FIG. 1. Referring to FIG. 2, if the gap between the first substrate 1a and the second substrate 1b is changed due to the deformation or damage of part of the first column spacer 7a formed at the area adjacent to the casing, an image defective area may be generated at areas corresponding to edges of the first and second substrates 1a and 1b. Moreover, as the LCD device is used for longer time, the image defective area is expected to be increased.

SUMMARY OF THE INVENTION

Accordingly, the present invention is directed to a liquid crystal display (LCD) device and a method for fabricating the same that substantially obviate one or more problems due to limitations and disadvantages of the related art.

An object of the invention is to provide an LCD device having an enhanced displaying quality of screen by minimizing a damage of a column spacer due to vibration caused by an external force.

Another object of the invention is to provide a method for fabricating an LCD device having an enhanced displaying quality of screen by minimizing a damage of a column spacer due to vibration caused by an external force.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes a first substrate having a plurality of pixels defined by crossing gate lines and data lines; a second substrate facing the first substrate; a thin film transistor formed at each crossing between the gate line and the data line on each pixel and having a gate electrode connected to the gate line and a source electrode connected to the data line; a pixel electrode formed at each pixel and connected to a drain electrode of the thin film transistor; a plurality of column spacers formed between the first and second substrates and configured to maintain a gap therebetween; and a protrusion formed on the first substrate and overlapped with one or more of the plurality of column spacers, wherein the protrusion includes a first layer made of the same material as an active layer of the thin film transistor and formed on the same layer as the active layer; a second layer made of the same material as the source and drain electrodes of the thin film transistor and formed on the same layer as the electrodes; and a third layer made of the same material as the pixel electrode and formed on the same layer as the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Description will now be given in detail of an LCD device and a fabricating method thereof according to the preferred embodiment of the invention, with reference to the accompanying drawings.

Hereinafter, the construction of an LCD device in accordance with a preferred embodiment of the invention will now be described with reference to FIGS. 3 to 5.

Figure 3:
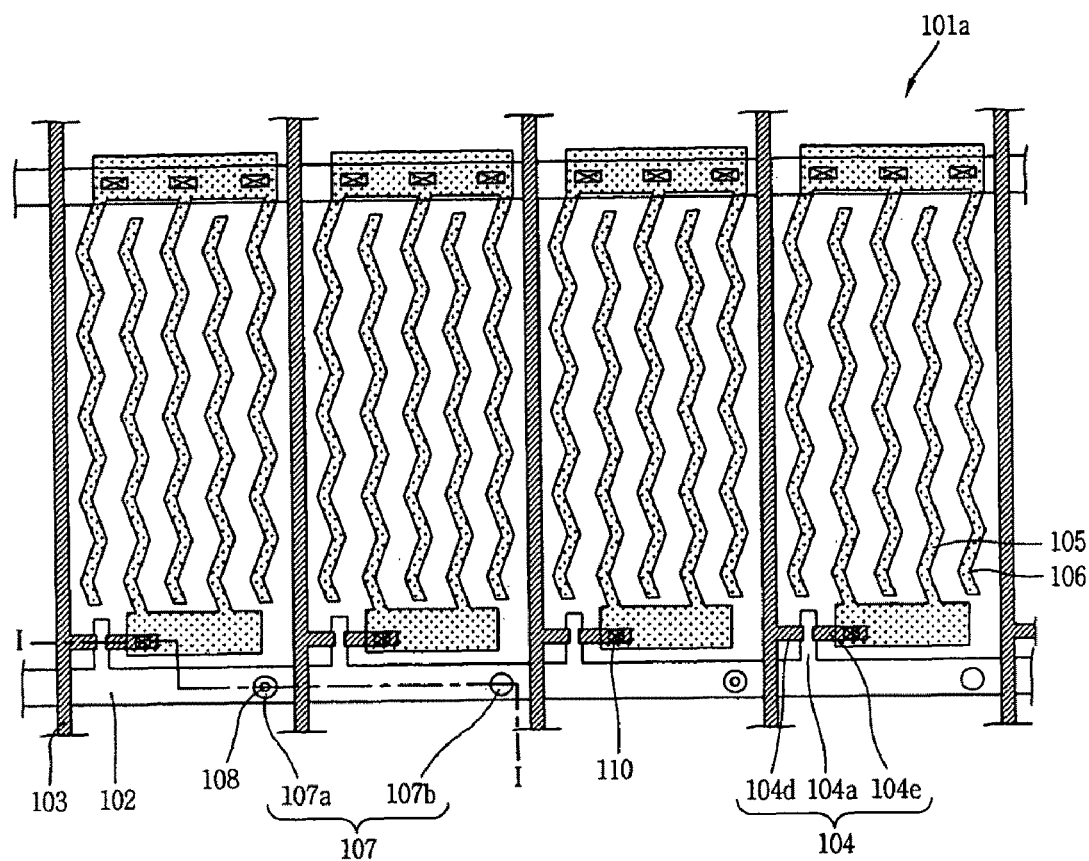
FIG. 3 is a planar view of an LCD device in accordance with an embodiment of the invention.

FIG. 3 is a planar view of an LCD device in accordance with an embodiment of the invention. FIG. 4 is a cross-sectional view of both first and second substrates along the line I-I' of FIG. 3. As shown in FIGS. 3 and 4, an LCD device in accordance with the preferred embodiment of the invention may include a first substrate 101a having a plurality of pixels defined by gate lines 102 and data lines 103 crossing each other, a second substrate 101b facing the first substrate 101a, thin film transistors (TFTs) 104 each formed at a crossing between the gate line 102 and the data line 103 of each pixel, and each having a gate electrode 104a connected to the gate line 102 and a source electrode 104d connected to the data line 103, pixel electrodes 105 each formed at each pixel and connected to a drain electrode 104e of the TFT 104, a plurality of column spacers 107 formed between the first substrate 101a and the second substrate 101b for maintaining the gap (space) therebetween, and protrusions formed on the first substrate 201a to face some of the plurality of column spacers 107. The protrusions 8 may include a first layer 108a made of the same material as an active layer 104c of the TFT 105 and formed on the same layer as the active layer 104c being located, a second layer 108b made of the same material as the source and drain electrodes 104d and 104e of the TFT 104 and formed on the same layer as those electrodes 104d and 104e being located, and a third layer 108c made of the same material as the pixel electrode 105 and formed on the same layer as the pixel electrode 105 being located.

Each component of the LCD device having such construction in accordance with the preferred embodiment of the invention will be described in detail.

Referring back to FIGS. 3 and 4, the LCD device according to the preferred embodiment is provided with an LC panel including the first substrate 101a as a TFT array substrate and the second substrate 101b as a color filter substrate, and an LC layer 140 sandwiched between the first and second substrates 101a and 101b.

Figure 4:
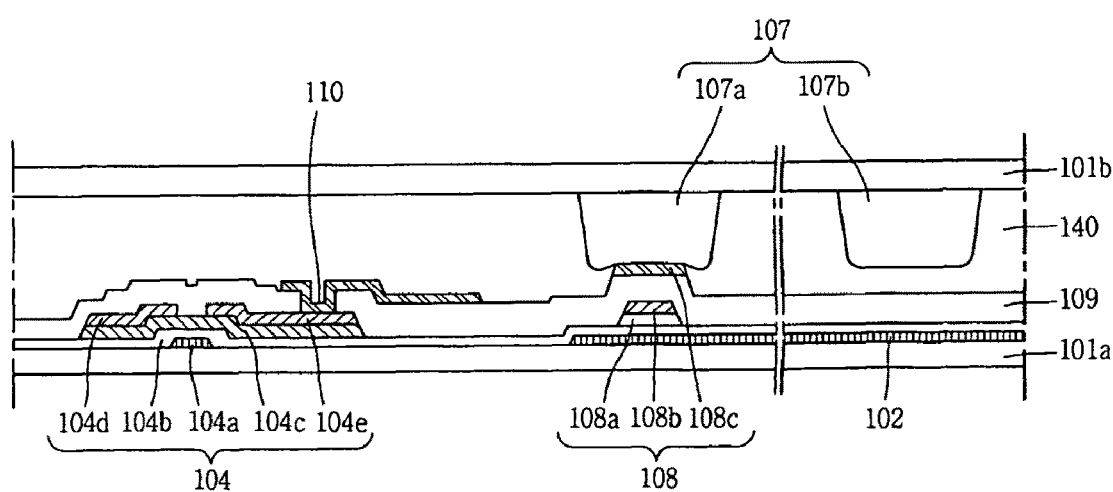
FIG. 4 is a cross-sectional view of both first and second substrates along the line I-I' of FIG. 3.

Referring to FIG. 4, the gate lines 102 and the data lines 103 defining plural pixels with crossing each other in horizontal and longitudinal directions are formed on the first substrate 101a. Each TFT 104 is formed at a crossing between the gate line 102 and the data line 103 on each pixel, so as to be connected to the gate line 102 and the data line 103.

As shown in FIG. 3 and 4, the TFT 104 formed on each pixel may include a gate electrode 104a formed on the first substrate 101a, a gate insulating layer 104b located on the gate electrode 104a, an active layer 104c located on the gate insulating layer 104d, and source electrode 104d and drain electrode 104e located on the active layer 104c. A protection film 109 is then disposed on the first substrate 101a having the TFTs 104 with such configuration.

As shown in FIG. 3, the pixel electrodes 105 diverged in plurality are formed on each pixel on the protection film 109. The pixel electrode 105 is connected to the drain electrode 104e of the TFT 104 within the corresponding pixel.

Common electrodes 106 diverged in plurality are formed on each pixel on the protection film 109 so as to be aligned alternate with the pixel electrodes 105. The common electrode 106 configures a horizontal electric field together with the pixel electrode 105, thus to drive the LC layer 140.

Although shown in the drawings, a color filter layer (not shown) including red, blue and green sub color filters is formed on the second substrate 101b, and a black matrix (not shown) is formed on boundary areas of the sub color filters and on an area corresponding to each TFT 104.

As shown in FIGS. 3 and 4, the column spacers 107, namely, the first column spacer 107a and the second column spacer 107b, for maintaining the gap between the first and second substrates 101a and 101b are formed on the second substrate 101b.

For reference, FIG. 3 shows the first substrate 101a and the components defined on the first substrate 101a. However, for the sake of the explanation, the first and second column spacers 107a and 107b are also shown in FIG. 3.

The first column spacer 107a is formed to be overlapped with the protrusion 108 of the first substrate 101a so as to come in contact therewith directly or indirectly, whereas the second column spacer 107b is not overlapped with the protrusion 108 of the first substrate 101a and is disposed with being spaced apart from a top layer (e.g., an alignment layer) of the first substrate 101a by a certain interval. Although not shown, the alignment layer is configured to initially align liquid crystal in a certain direction.

The first column spacer 107a maintains a constant cell gap between the first and second substrates 101a and 101b together with the protrusion 108, which is thusly called a gap spacer. The second column spacer 107b comes in contact with a top layer (e.g., an alignment layer) of the first substrate 101a when pressure is applied to the first substrate 101a or the second substrate 101b, so as to prevent an excessive deformation of the first and second substrates 101a and 101b, which is thusly called a press spacer.

Referring to FIG. 4, the protrusion 108, which is overlapped with one end of the first column spacer 107a to press the same by a certain pressure, includes the first layer 108a, the second layer 108b and the third layer 108c.

The first layer 108a of the protrusion 108 is made of the same material as the active layer 104c of the TFT 104 and formed on the same layer as the active layer 104c being located, the second layer 108b is made of the same material as the source and drain electrodes 104d and 104e of the TFT and formed on the same layer as the electrodes 104d and 104e being located, and the third layer 108c is made of the same material as the pixel electrode 105 and formed on the same layer as the pixel electrode 105 being located.

The protrusion 108, as mentioned above, is disposed to continuously press upwardly the first column spacer 107a by a certain pressure, so as to be overlapped with each other. Accordingly, even if a vibration due to an external force is applied to the first substrate 101a and the second substrate 101b, the protrusion 108 and the first column spacer 107a move in the same direction.

In an embodiment of the invention, the protrusion 108 is formed to be overlapped with the gate line 102 on the first substrate 101a has been shown in FIGS. 3 and 4. In other embodiments, the protrusion 108 may formed on different positions on the substrate.

Although not shown in detail, the first and second substrates 101a and 101b are received and fixed in a casing including a lower cover (not shown), an upper cover (not shown) and a main support (not shown) and the like. Most of such casing is disposed to press edges of the first and second substrates 101a and 101b. Relatively many number of protrusions 108 are formed at the area adjacent to the casing on the first substrate 101a, and relatively small number of protrusions 108 are formed at the other areas.

Figure 5:
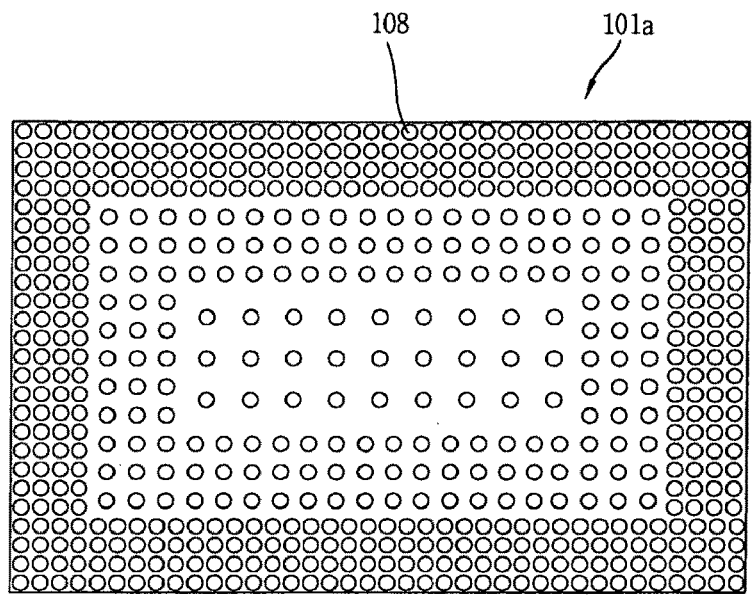
FIG. 5 is a planar view of an exemplary distribution of protrusions shown in FIG. 3.

FIG. 5 is a planar view of an exemplary distribution of protrusions shown in FIG. 3. FIG. 5 shows an enlarged view of the protrusion 108 among the plural components formed on the first substrate 101a in order to conceptually represent the distribution of the protrusions 108. As shown in FIG. 5, the distribution of the protrusions 108 decreases from the edge of the first substrate 101a toward the central portion thereof.

In an embodiment of the invention, as shown in FIG. 5 and the above description, the distribution of the protrusions 108 is decreased from the edge of the first substrate 101a toward the central portion thereof, however. In another embodiment, many variations, such as distributing relatively many protrusions 108 at an area having a defect found out through an impact test which is executed before packing products, can be considered.

Hereinafter, a method for fabricating an LCD device in accordance with a preferred embodiment of the invention will be described with reference to FIGS. 6a to 6k. For the sake of explanation of the fabricating method, components not shown in FIGS. 6a to 6k will be referred to FIG. 3.

FIGS. 6a to 6k are cross-sectional views of steps for fabricating the LCD device shown in FIG. 3. In an embodiment of the invention, each of first to fourth photosensitive films 121, 122, 123 and 124 employed in the description herein is in a positive format in which an exposed portion is removed. In another embodiment, the first to fourth photosensitive films 121, 122, 123 and 124 employed in the fabricating method of the LCD device me be in a negative format in which a non-exposed portion is removed.

First, a first substrate 101a having a plurality of pixels defined is prepared.

Figure 6A:
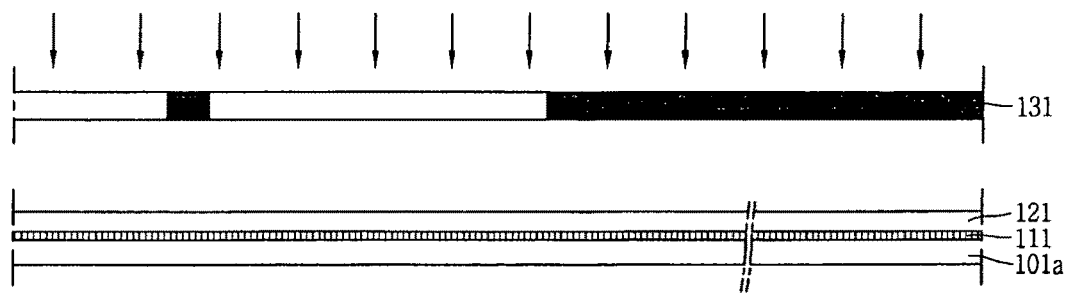
FIGS. 6a to 6k are cross-sectional views of steps for fabricating the LCD device shown in FIG. 3.

Next, as shown in FIG. 6a, a first metallic layer 111 and a first photosensitive film 121 are sequentially formed on the first substrate 101a, and thereafter a first photolithography using a first mask 131 is executed to form a first photosensitive pattern (not shown).

Here, the first mask 131 is provided with a non-transmissive region defined at an area where the gate electrode 104a and the gate line 102 are to be formed and a transmissive region defined at the other areas excluding the non-transmissive region. The first mask 131 is shown having a positive structure. However, if the first mask 131 has a negative structure, the non-transmissive region may be switched with the transmissive region when compared with the positive structure.

Figure 6B:
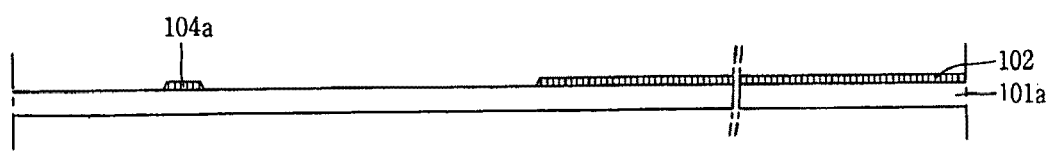

Next, the first metallic layer 111 is selectively removed by using the first photosensitive pattern, thereby forming the gate electrode 104a of the TFT 104 and the gate line 102, as shown in FIG. 6b.

Next, a gate insulating layer 104b is formed on the first substrate 101a.

Figure 6C:
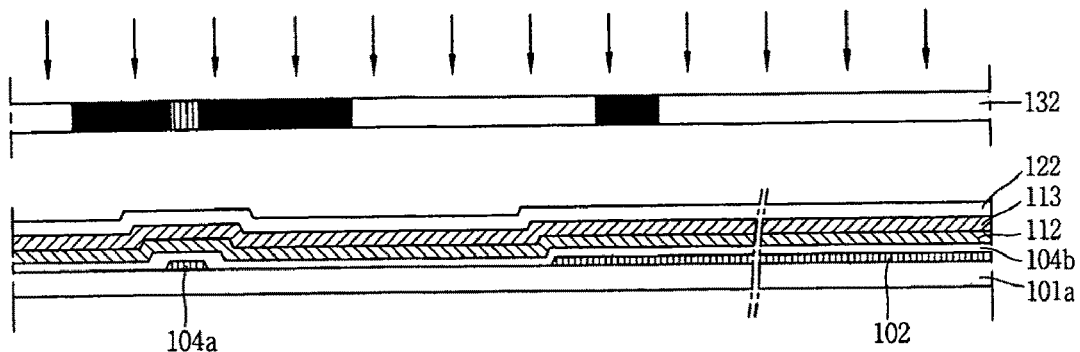

Afterwards, as shown in FIG. 6c, a semiconductor layer 112, a second metallic layer 113 and a second photosensitive film 122 are sequentially formed on the gate insulating layer 104b, and a second photolithography using a second mask 132 is executed so as to form a second photosensitive pattern (not shown).

Here, the second mask 132 is provided with a non-transmissive region defined at an area where source electrode 104d and drain electrode 104e are to be formed and an area where a first layer 108a and a second layer 108b of the protrusion 108 are to be formed, a slit region (or a semi-transmissive region) defined at an area between the source electrode 104d and the drain electrode 104e, and a transmissive region defined at the other regions excluding the non-transmissive region and the slit region.

Figure 6D:
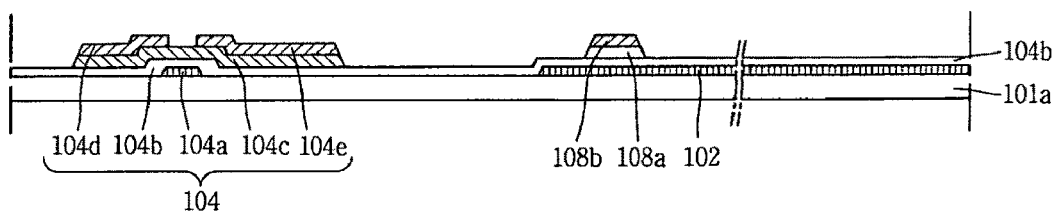

Next, the second metallic layer 113 and the semiconductor layer 112 are selectively removed by using the second photosensitive pattern, so as to form an active layer 104c of the TFT 104 and the first and second layers 108a and 108b of the protrusion 108, as shown in FIG. 6d. Afterwards, an area of the second photosensitive pattern corresponding to the slit region (or the semi-transmissive region) is removed so as to form a third photosensitive pattern (not shown), which is then used to selectively remove the second metallic layer 113, thereby forming the source electrode 104d and the drain electrode 104e of the TFT 104. Here, the first layer 108a of the protrusion 108 is formed at an area overlapped with the gate line 102, and is less distributed at the central portion of the first substrate 101a than at the edge of the first substrate 101a.

In the drawings and the description thereof, it has been described the protrusion 108 having the first layer 108a is formed at the area overlapped with the gate line 102; however, it is merely exemplary, not being limited to. The protrusion 108 may be formed at other areas within the scope of the present invention.

In an embodiment, the protrusion 108 having the first layer 108a is less distributed at the central portion of the first substrate 101a than at the edge of the first substrate 101a. In another embodiment, many variations, such as distributing relatively many protrusions 108 at an area having a defect found out through an impact test which is executed before packing products, can be considered.

Figure 6E:
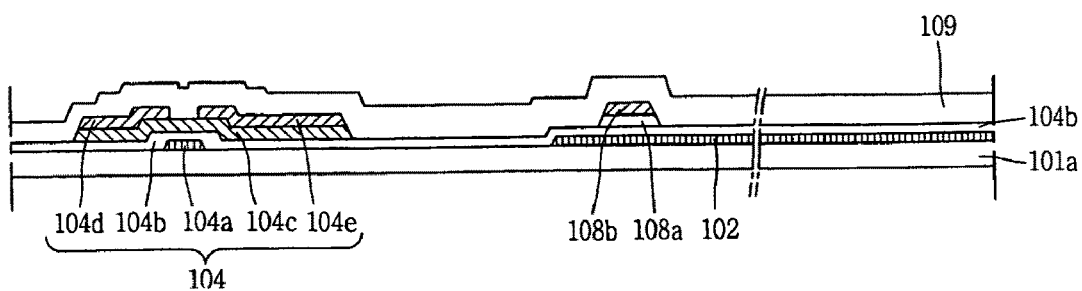

Afterwards, as shown in FIG. 6e, a protection film 109 is covered on the first substrate 101a provided with the source electrode 104d and the drain electrode 104e of the TFT 104 and the second layer 108b of the protrusion 108.

Figure 6F:
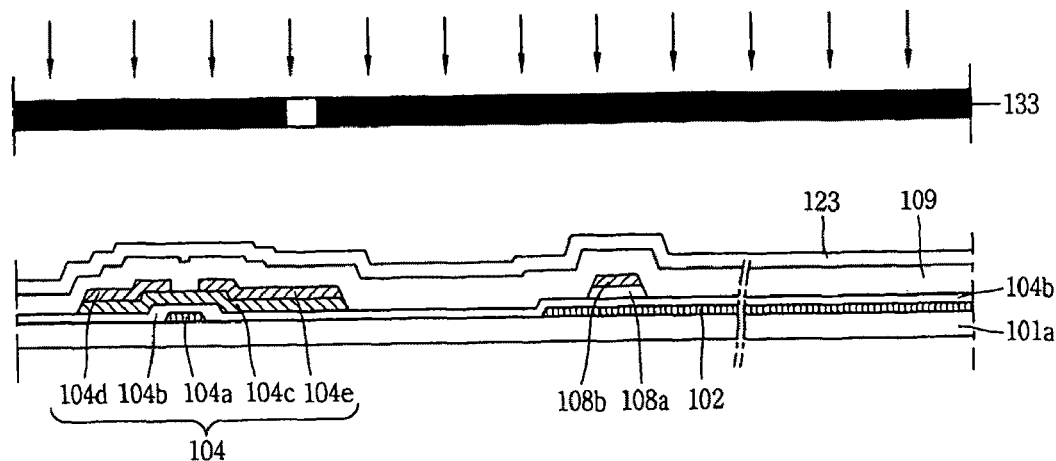

Next, as shown in FIG. 6f, after forming a third photosensitive film 123 on the protection film 109, a third photolithography is executed using a third mask 133 to form a fourth photosensitive pattern (not shown). Here, the third mask 133 is provided with a transmissive region defined at an area where a contact hole 110, through which the drain electrode 104e of the TFT 104 is partially exposed, is to be formed, and a non-transmissive region defined at the other areas excluding the transmissive region.

Figure 6G:
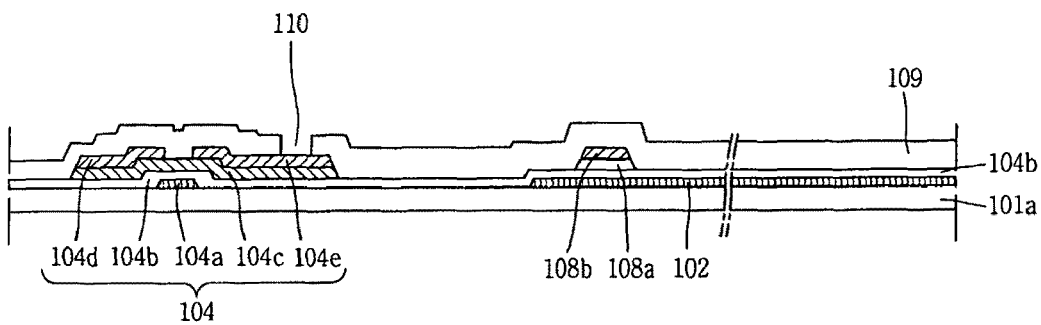

Afterwards, the protection film 109 is selectively removed by using the fourth photosensitive pattern, so as to form the contact hole 110, as shown in FIG. 6g.

Figure 6H:
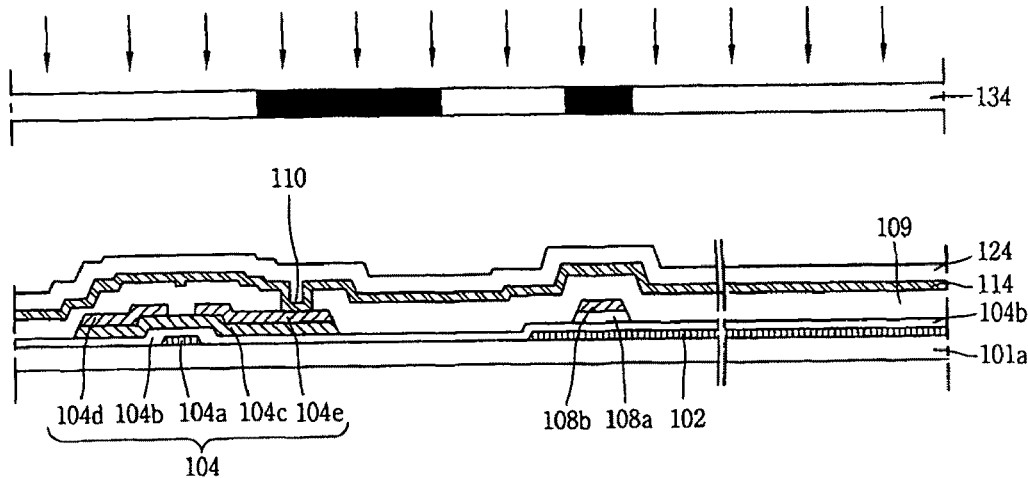

A conductive material layer 114 and a fourth photosensitive film 124 are then sequentially formed on the protection film 109, as shown in FIG. 6h. After then, a fourth photolithography is executed using a fourth mask 134 so as to form a fifth photosensitive pattern (not shown).

Here, the fourth mask 134 is provided with a non-transmissive region defined at an area where a pixel electrode 105 and a third layer 108c of the protrusion 108 are to be formed, and a transmissive region defined at the other areas excluding the non-transmissive region.

The conductive material layer 114 may be formed of transparent conductive oxide or a non-transparent metal. One example of the transparent conductive oxide may include indium tin oxide (ITO).

Figure 6I:
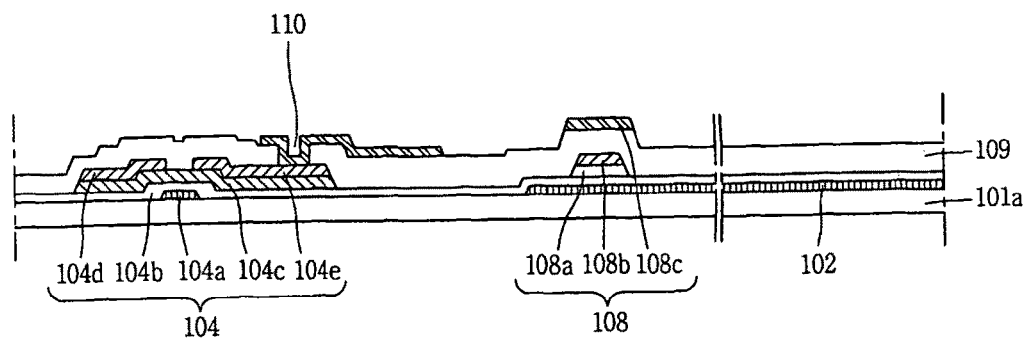

Next, the conductive material layer 114 is selectively removed using the fifth photosensitive pattern, so as to form the pixel electrode 105 coming in contact with the drain electrode 104e of the TFT 104 and a third layer 108c of the protrusion 108, as shown in FIG. 6i. Here, the third layer 108c of the protrusion 108 is formed to be overlapped with the first and second layers 108a and 108b.

Afterwards, a second substrate 101b is prepared.

Figure 6J:
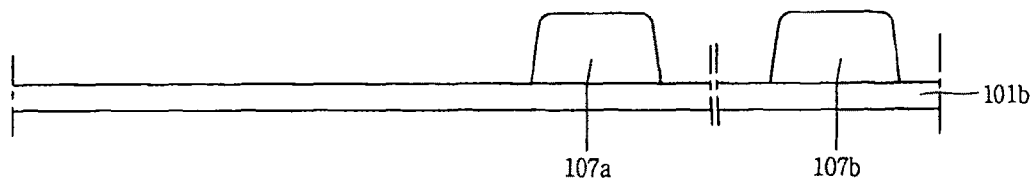

Next, as shown in FIG. 6j, a first column spacer 107a and a second column spacer 107b are formed on the second substrate 101b. Here, the first column spacer 107a is formed at a position overlapped with the protrusion 108 on the first substrate 101a.

Although not shown in detail in the drawings, the first and second column spacers 107a and 107b may be formed, in a sequential manner, by forming a polymer material layer (not shown) and the fifth photosensitive film (not shown) on the second substrate 101b, forming a sixth photosensitive pattern (not shown) through a fifth photolithography using a fifth mask (not shown), and selectively removing the polymer material layer using the sixth photosensitive pattern.

Figure 6K:
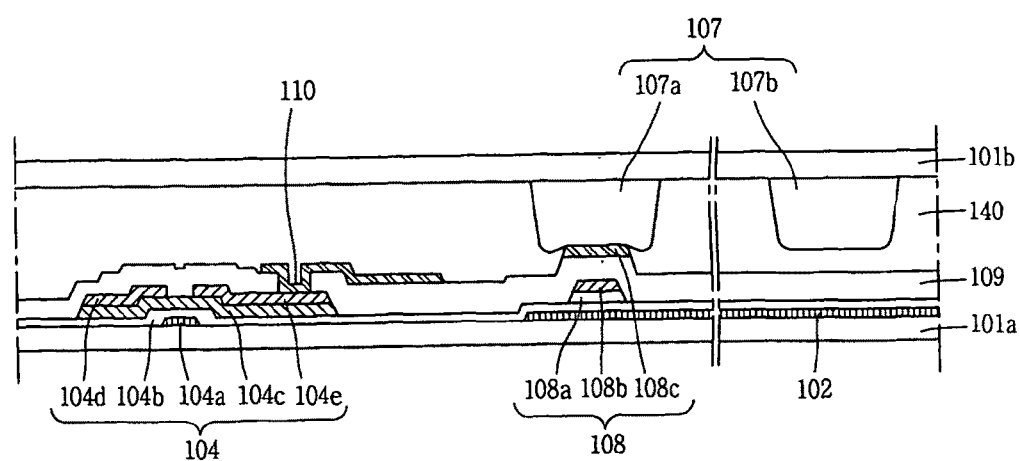

Next, as shown in FIG. 6k, the first substrate 101a and the second substrate 101b are bonded to each other such that the first column spacer 107a is overlapped with the protrusion 108. Here, the protrusion 108 presses the first column spacer 107a by a certain pressure.

In an embodiment of the invention, since the protrusion 108 presses the first column spacer 107a by the certain pressure, upon a vibration being applied due to an external force, the first column spacer 107a and the protrusion 108 can be prevented from being moved by a casing (not shown) in respectively different directions. Therefore, the deformation and damage of the first column spacer 107a due to the protrusion 108 can be prevented.

Moreover, in an embodiment of the invention, since the protrusion 108 presses the first column spacer 107a by the certain pressure, a liquid crystal margin can be ensured in a larger range, thereby decreasing liquid crystal consumption.

If the liquid crystal is not fully filled in a space between the first substrate 101a and the second substrate 101b, a touch defect may be caused. On the other hand, if the liquid crystal is excessively filled therein, a gravity defect may be caused. However, an embodiment of the invention ensures a larger range of liquid crystal margin, so as to reduce probability of such defect occurrence. Here, the touch defect indicates that when a user, for example, rubs a screen, the liquid crystal is not restored to its original state, such that stains remain on the screen. When the liquid crystal is not as much as being fully filled in the space between the first substrate 101a and the second substrate 101b, such touch defect can be aggravated. The gravity defect indicates that the liquid crystal flows down in a gravity direction so as to occur a screen defect. When the liquid crystal is excessively filled in the space between the first substrate 101a and the second substrate 101b, such gravity defect can be aggravated.

Figures 7, 8:
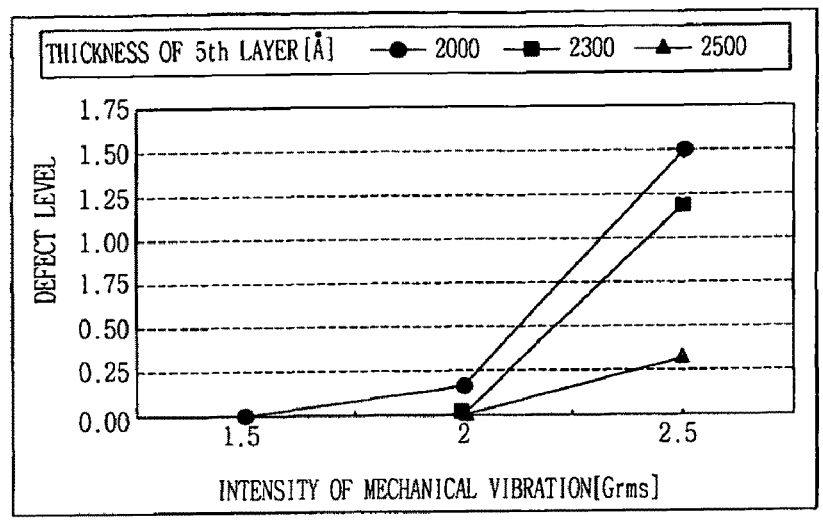
FIGS. 7 and 8 are graph and table, respectively, showing test results for an LCD device having comparative protrusions with the same thickness as that of the protrusion of FIG. 3.

FIGS. 7 and 8 are graph and table, respectively, showing test results for an LCD device having comparative protrusions with the same thickness as that of the protrusion of FIG. 3. That is, by using the test results for the LCD device having the comparative protrusion (not shown) having the same thickness as that of the protrusion 108 as shown in FIGS. 7 and 8, the effect obtained by disposing the protrusion 108 to press the first column spacer 107a by a certain pressure can be shown. For the description based upon FIGS. 7 and 8, other components except for the comparative protrusion, among the components of the LCD device having the comparative protrusion, will be described based upon the reference numerals given in FIGS. 3 and 4 showing the LCD device according to an embodiment of the invention.

The comparative protrusion is provided with a fourth layer (not shown) and a fifth layer (not shown). The fourth layer is made of the same material as the active layer 104c of the TFT 104 and formed on the same layer as the active layer 104c being located. Here, the fourth layer has the same thickness as that of the first layer 108a of the protrusion 108 according to an embodiment of the invention. Also, the fifth layer is made of the same material as the source and drain electrodes 104d and 104e of the TFT 104 and formed on the same layer as the electrodes 104d and 104e being located. Here, the fifth layer is as thick as adding the thickness of the second layer 108b and that of the third layer 108c of the protrusion 108.

FIG. 7 is a graph showing test results of defect levels according to a mechanical vibration as increasing the thickness of the fifth layer of the comparative protrusion. Here, the defect levels have been represented as relative numbers, under the assumption that the defect level is "0" if there is no defect, the defect level is "1" if a low defect, such as a dark thin line, is found out at a lower portion of a screen, the defect level is "2" if a high defect, such as a darker and thinner line, is observed, and the defect level is "3" if such defective line is observed at all four edges of the screen. Such defect may be a screen defect which may be caused by the deformation or damage of the first column spacer 107a due to a friction between the comparative protrusion and the first column spacer 107a.

As shown in FIG. 7, in the LCD device having the comparative protrusion, the highest defect level is observed when the thickness of the fifth layer is 2000[□] whereas the lowest defect level is observed when the thickness of the fifth layer is 2500[□]. Therefore, as the comparative protrusion is thicker, the defect level according to the intensity of mechanical vibration can be decreased.

Also, FIG. 8 is a table showing measurement results of liquid crystal margins in a plurality of LCD devices (e.g., 8 LCD devices) according to the related art and a plurality of LCD devices (e.g., 8 LCD devices) having the comparative protrusions. Here, an example is illustrated that 244-dot liquid crystal is a reference point to fully fill the space between the first substrate 101a and the second substrate 101b.

As shown in FIG. 8, since the LCD device according to the related art has a 9-dot liquid crystal margin whereas the LCD device having the comparative protrusion has a 13-dot liquid crystal margin, it can be noticed that the LCD device having the comparative protrusion ensures 4-dot more liquid crystal margin.

As shown in FIGS. 7 and 8, the LCD device having the comparative protrusion with the same thickness as that of the protrusion 108 according to an embodiment of the invention can have advantages of having an enhanced displaying quality of screen because a defect occurrence caused by a vibration due to an external force is reduced, and also of minimizing the liquid crystal consumption due to ensuring a large range of liquid crystal margins.

However, the fifth layer of the comparative protrusion having the same thickness as that of the protrusion 108 according to an embodiment of the invention is formed of a metal, which is the same material as the source and drain electrodes 104d and 104e of the TFT 104, and has a thickness corresponding to the sum of thicknesses of the second layer 108b and the third layer 108c of the protrusion 108, whereby an excessively thick metallic layer is configured. As a result, the chance of causing defects, such as short, during the fabricating process of the LCD device can be increased. In addition, in the LCD device having the comparative protrusion, the comparative protrusion is formed together with the active layer and the source and drain electrodes of the TFT. Accordingly, as the comparative protrusion becomes thicker, the source and drain electrodes of the TFT also become thicker, and as a result, a short may be caused at an overlapped area between the source and drain electrodes and the gate electrode.

As such, it can be understood as follows from the description with reference to FIGS. 7 and 8. That is, by implementing the structure of the LCD device according to an embodiment of the invention in which the protrusion 108 having the same thickness as that of the comparative protrusion (not shown) is provided and simultaneously the second layer 108b of the protrusion 108 is configured as a metallic layer thinner than the fifth layer of the comparative protrusion (not shown), a defect caused by a vibration due to an external force can be reduced, a larger range of liquid crystal margins can be ensured, and simultaneously the chance of short occurrence of the second layer 108b cannot be concerned while driving the LCD device.

Figure 1:
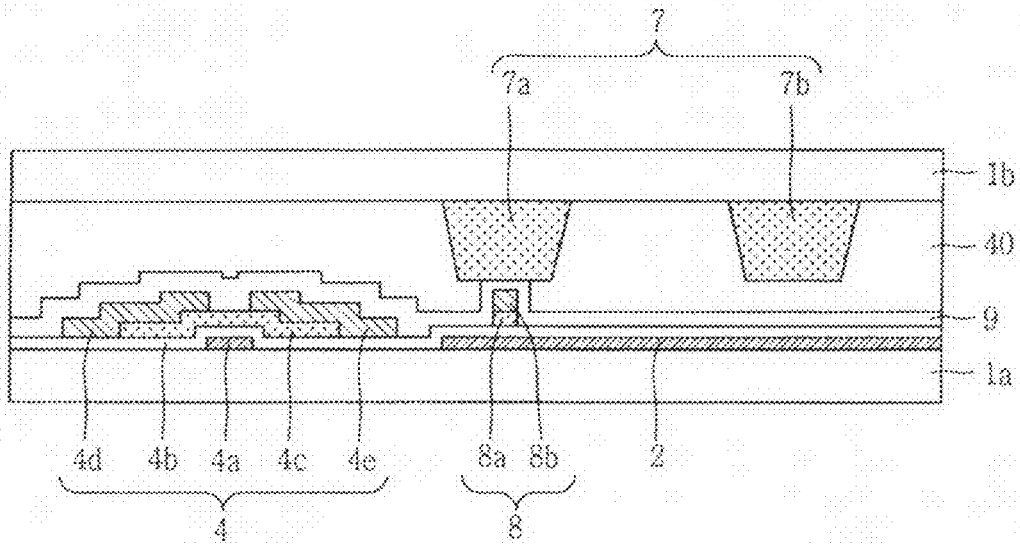
FIG. 1 shows a cross-sectional view of a LCD device according to the related art.
Figure 2:
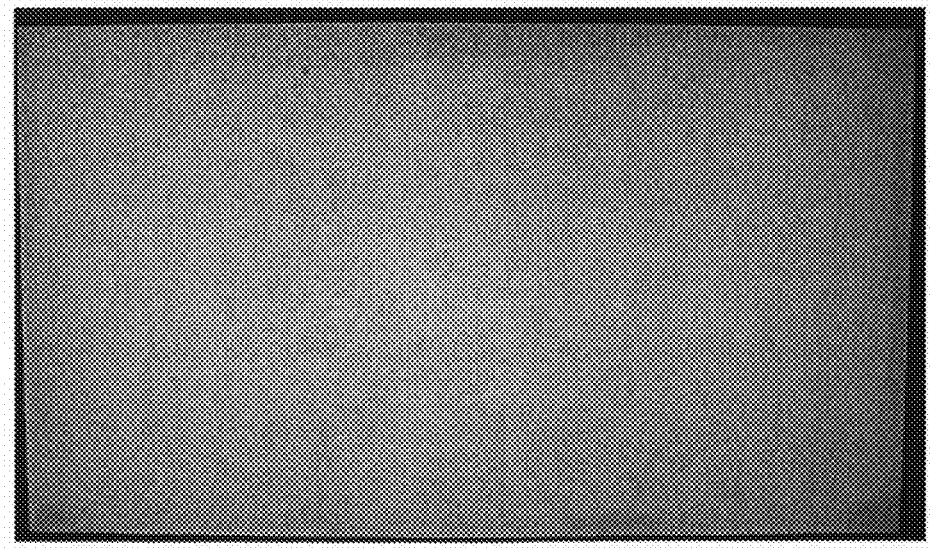
FIG. 2 is a photograph showing an image defective area in the related art LCD device of FIG. 1.
Figure 9:
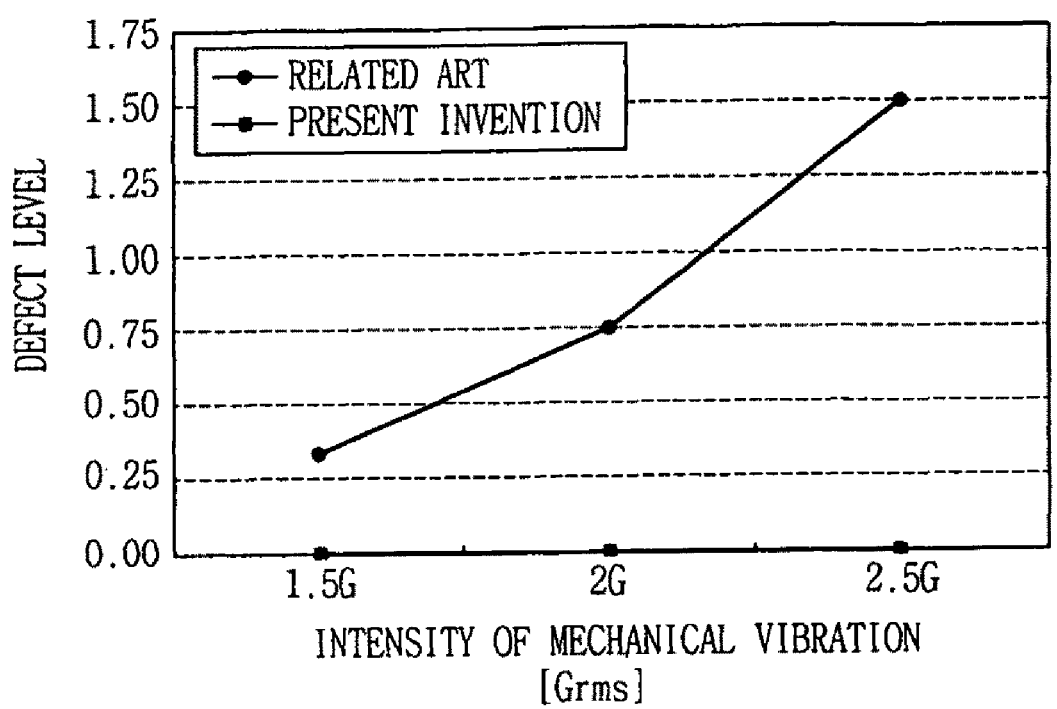
FIG. 9 is graph showing test results for the LCD device of FIG. 1 and the LCD device of FIG. 3.

FIG. 9 is graph showing test results for the LCD device of FIG. 1 and the LCD device of FIG. 3. The graph in FIG. 9 shows test results of defect levels according to a mechanical vibration respectively in the LCD device according to an embodiment of the invention as shown in FIGS. 3 and 4 and the related art LCD device as shown in FIG. 1. The present invention has given tests under the assumption that the third layer 108c of the protrusion 108 has a thickness of 400 Å. Here, the defect levels have been represented as relative numbers, similar to FIG. 7, under the assumption that the defect level is "0" if there is no defect, the defect level is "1" if a low defect, such as a dark thin line, is found out at a lower portion of a screen, the defect level is "2" if a high defect, such as a darker and thinner line, is observed, and the defect level is "3" if such defective line is observed at all four edges of the screen.

As shown in FIG. 9, the related art LCD device increases the defect level when the mechanical vibration is stronger; however, the LCD device according to an embodiment of the invention having the protrusion 108 provided with the first, second and third layers 108a, 108b and 108c rarely occurs any defect even if the mechanical vibration is stronger.

That is, the LCD device according to an embodiment of the invention can enhance the displaying quality of screen because a vibration due to an external force cannot deform or damage the first column spacer 107a, reduce the consumption of liquid crystal due to ensuring a large range of liquid crystal margins, and also improve the displaying quality of screen because a short of the protrusion 108 cannot occur while driving the LCD device.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   a first substrate having a plurality of pixels defined by crossing gate lines and data lines;
   a second substrate facing the first substrate;
   a thin film transistor formed at each crossing between the gate line and the data line on each pixel and having a gate electrode connected to the gate line and a source electrode connected to the data line;
   a pixel electrode formed at each pixel and connected to a drain electrode of the thin film transistor;

a plurality of column spacers formed between the first and second substrates and configured to maintain a gap therebetween; and a protrusion formed on the first substrate and overlapped with one or more of the plurality of column spacers, wherein the protrusion includes:
- a first layer made of the same material as an active layer of the thin film transistor and formed on the same layer as the active layer,
- a second layer made of the same material as the source and drain electrodes of the thin film transistor and formed on the same layer as the electrodes, and
- a third layer made of the same material as the pixel electrode and formed on the same layer as the pixel electrode,
- wherein a width of the third layer is wider than widths of the first and second layers so as to cover the first and second layers, and is narrower than a width of the column spacer,
- wherein the pixel electrodes diverged in plurality,
- common electrodes diverged in plurality are formed on each pixel so as to be aligned alternate with the pixel electrodes.

2. The device of claim 1, wherein the column spacers are formed on the second substrate.

3. The device of claim 1, wherein the protrusion is disposed to press upwardly the column spacer.

4. The device of claim 1, wherein the protrusion is formed on the gate line of the first substrate.

5. The device of claim 1, wherein the protrusion is less distributed at a central portion of the first substrate than at an edge of the first substrate.

* * * * *